US009582054B2

United States Patent
Yang et al.

(10) Patent No.: US 9,582,054 B2
(45) Date of Patent: Feb. 28, 2017

(54) METHOD AND APPARATUS FOR SELECTING THE OUTPUT OF PROGRAMMABLE POWER ADAPTER

(71) Applicant: SYSTEM GENERAL CORP., Taipei Hsien (TW)

(72) Inventors: Ta-Yung Yang, Milpitas, CA (US); Chou-Sheng Wang, Keelung (TW); Yi-Min Hsu, Taichung (TW); Jenn-Yu G. Lin, New Taipei (TW); Tse-Jen Tseng, Taichung (TW)

(73) Assignee: System General Corp., Taipei Hsien (TW)

( * ) Notice: Subject to any disclaimer, the term of this patent is extended or adjusted under 35 U.S.C. 154(b) by 64 days.

(21) Appl. No.: 14/305,077

(22) Filed: Jun. 16, 2014

(65) Prior Publication Data

US 2014/0372776 A1    Dec. 18, 2014

Related U.S. Application Data

(60) Provisional application No. 61/836,037, filed on Jun. 17, 2013.

(51) Int. Cl.
*G06F 1/26* (2006.01)
(52) U.S. Cl.
CPC ..................................... *G06F 1/26* (2013.01)
(58) Field of Classification Search
CPC ........................................................ G06F 1/26
See application file for complete search history.

(56) References Cited

U.S. PATENT DOCUMENTS

| | | | |
|---|---|---|---|
| 6,459,175 B1 | 10/2002 | Potega | |
| 2003/0222503 A1 | 12/2003 | Lam et al. | |
| 2004/0189309 A1* | 9/2004 | Bertness | G01R 31/3648 324/426 |
| 2005/0174094 A1 | 8/2005 | Purdy et al. | |
| 2005/0248309 A1* | 11/2005 | Denning | B25F 5/00 320/106 |
| 2008/0164759 A1* | 7/2008 | Sharma | H02J 1/10 307/52 |
| 2012/0008354 A1* | 1/2012 | Tang | H02M 1/32 363/126 |
| 2013/0093263 A1 | 4/2013 | Lanni | |

(Continued)

FOREIGN PATENT DOCUMENTS

CN    1159831 C    7/2004
CN    101030189 A    9/2007

(Continued)

*Primary Examiner* — Albert Wang
(74) *Attorney, Agent, or Firm* — Rosenberg, Klein & Lee (57) ABSTRACT

An apparatus of programming an output of a programmable power adapter according to the present invention comprises a control circuit. The method according to the present invention sends a signal to a device. A resistor is coupled to the signal to determine the level of the signal. The resistor is installed in the device. The method according to the present invention checks the level of the signal in the programmable power adapter and determines an output voltage of the programmable power adapter in accordance with the level of the signal. The output voltage of the programmable power adapter is coupled to the device to provide a power for a load of the device.

18 Claims, 8 Drawing Sheets

(56) References Cited

U.S. PATENT DOCUMENTS

2015/0370314 A1* 12/2015 Atkinson ................ G05F 5/00
                                                                        713/320

FOREIGN PATENT DOCUMENTS

| | | |
|---|---|---|
| CN | 200993746 Y | 12/2007 |
| CN | 101398459 A | 4/2009 |
| CN | 101714817 A | 5/2010 |
| CN | 101986381 A | 3/2011 |
| CN | 102684268 A | 9/2012 |
| EP | 2573921 A1 | 3/2013 |
| TW | 201236330 A1 | 9/2012 |
| WO | 2009/086567 A1 | 7/2009 |
| WO | 2011/157243 A2 | 12/2011 |
| WO | 2013/020281 A1 | 2/2013 |

\* cited by examiner

METHOD AND APPARATUS FOR SELECTING THE OUTPUT OF PROGRAMMABLE POWER ADAPTER

REFERENCE TO RELATED APPLICATION

This Application is based on Provisional Patent Application Ser. No. 61/836,037, filed 17 Jun. 2013, currently pending.

BACKGROUND OF THE INVENTION

Field of the Invention

The present invention relates the programmable power adapter, and more particularly, relates to a method and an apparatus for selecting the output of the programmable power adapter.

Description of the Related Art

The power adapter has been widely used to provide the power source for electronic products. In conventional techniques, one power adapter only provides a specific power source, which cannot provide programmable power sources for different electronic products. Therefore, the present invention provides a programmable power adapter which provides programmable power sources for different electronic products. Further, the present invention provides a method and an apparatus for selecting the output (power source) of the programmable power adapter. This programmable power adapter can be applied to charge the battery of the mobile device.

BRIEF SUMMARY OF THE INVENTION

An objective of the present invention is to provide a programmable power adapter which adaptively selects its output.

An objective of the present invention is to provide a method and an apparatus for programming the output of the programmable power adapter.

The method of programming an output of a programmable power adapter according to the present invention comprises sending a signal to a device; checking the level of the signal in the programmable power adapter; and determining an output voltage of the programmable power adapter in accordance with the level of the signal. A resistor installed in the device is coupled to the signal to determine the level of the signal. The output voltage of the programmable power adapter is coupled to the device to provide a power for a load of the device.

The method of programming an output of a power adapter according to the present invention comprises sending a signal to a device; checking the level of the signal in the power adapter; and determining an output voltage of the power adapter in accordance with the level of the signal. A voltage-clamp device installed in the device is coupled to the signal to determine the level of the signal. The output voltage of the power adapter is coupled to the device to provide a power for a load of the device.

An apparatus of programming an output of a programmable power adapter according to the present invention comprises a control circuit. The control circuit sends a signal to a device. The device is coupled to the signal to determine the level of the signal. The control circuit checks the level of the signal for determining an output voltage of the programmable power adapter in accordance with the level of the signal. An identification circuit installed in the device is coupled to the signal to determine the level of the signal. The output voltage of the programmable power adapter is coupled to the device to provide a power for a load of the device.

A programmable power adapter according to the present invention comprises a control circuit and a programmable power supply circuit. The control circuit sends a signal to a device. The device is coupled to the signal to determine the level of the signal. The control circuit checks the level of the signal. The programmable power supply circuit generates an output voltage of the programmable power adapter and determines the output voltage in accordance with the level of the signal.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF THE INVENTION

Figure 1:
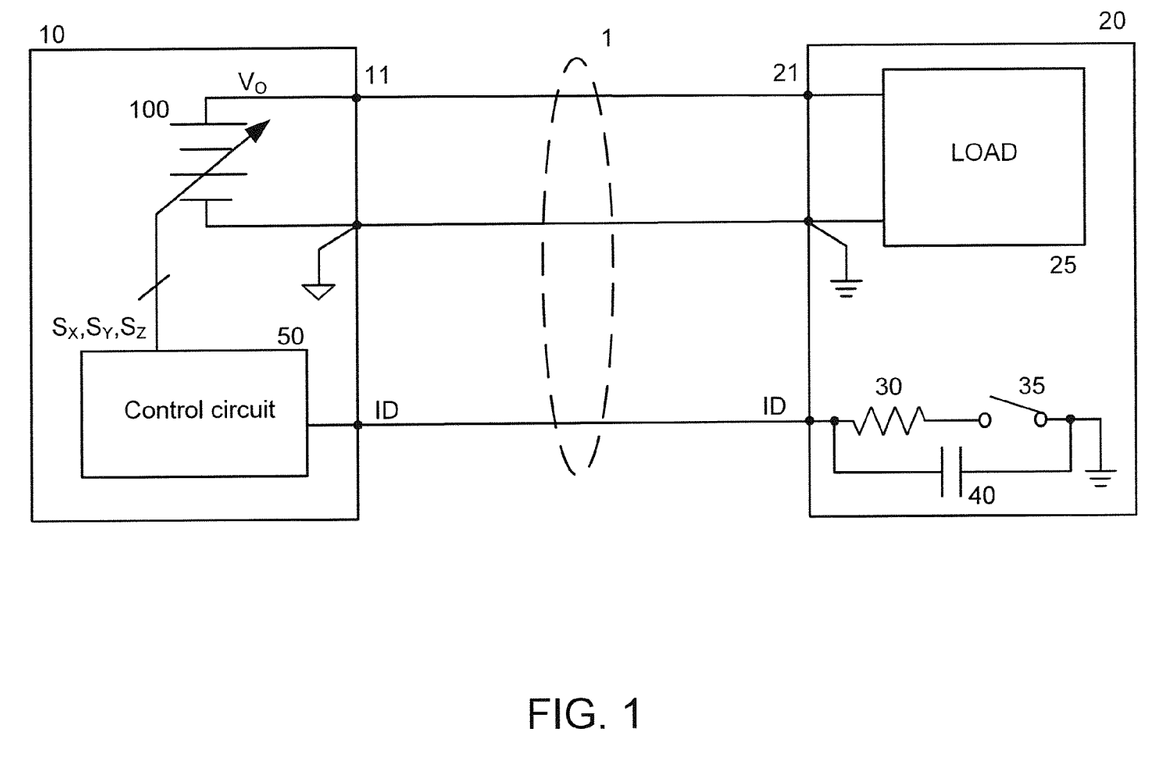
FIG. 1 is a circuit diagram of an embodiment of the system for selecting the output of a programmable power adapter according to the present invention.

FIG. 1 is a circuit diagram of an embodiment of the system for selecting the output of a programmable power adapter 10 according to the present invention. A programmable power adapter 10 includes a programmable power supply circuit 100 and a control circuit 50. An output terminal of the control circuit 50 is connected with the programmable power supply circuit 100 to control the programmable power supply circuit 100. The programmable power supply circuit 100 is connected to an output terminal 11 of the programmable power adapter 10 and a ground. The programmable power supply circuit 100 will provide an output voltage $V_O$ coupled to supply a power to a device 20 through a cable 1. The device 20 can be a mobile device according to one embodiment of the present invention.

The device 20 includes a load 25 and a resistor 30. An input terminal 21 of the device 20 is connected with the output terminal 11 of the programmable power adapter 10 through the cable 1 to receive the output voltage $V_O$. The device 20 is further coupled to a ground which is different from the ground connected with the programmable power supply circuit 100. The load 25 is connected to the input terminal 21 of the device 20 and the ground connected with the device 20. The resistance of the resistor 30 is utilized to program a level of the output voltage $V_O$. A switch 35 is connected between a first terminal of the resistor 30 and the ground of the device 20. The switch 35 (optional) is coupled to the resistor 30 in series for controlling the enablement/disablement of the resistor 30. The switch 35 is controlled by the device 20. A first terminal of a capacitor 40 is coupled to a second terminal of the resistor 30. A second terminal of the capacitor 40 is coupled to the join of the switch 35 and the ground of the device 20. The capacitor 40 is coupled to the resistor 30 in parallel when the switch 35 is switched on. The capacitor 40 is used for the identification of the selection of the output voltage $V_O$.

The programmable power adapter 10 and the device 20 respectively have a terminal ID used for the connection via a wire of the cable 1. The resistor 30 is coupled to the control circuit 50 of the programmable power adapter 10 through the terminals ID. The terminals ID are connected between the programmable power adapter 10 and the device 20 via the wire of the cable 1. The capacitance of the capacitor 40, the resistance of the resistor 30, and the impedance of the terminals ID of the programmable power adapter 10 and the device 20 develop a network (a timing circuit) that helps the control circuit 50 to identify the circuit (the resistor 30 and the capacitor 40) that developed in the device 20 is used for selecting the output voltage $V_O$ of the programmable power adapter 10. Therefore, the resistor 30 and the capacitor 40 are operated as an identification circuit. The programmable power adapter 10 identifies the device 20 via the identification circuit for adaptively selecting the output voltage $V_O$ supplied to the load 25 of the device 20. The level of the output voltage $V_O$ is programmable, such as 5V, 9V, 12V or 20V, etc.

Figure 2:
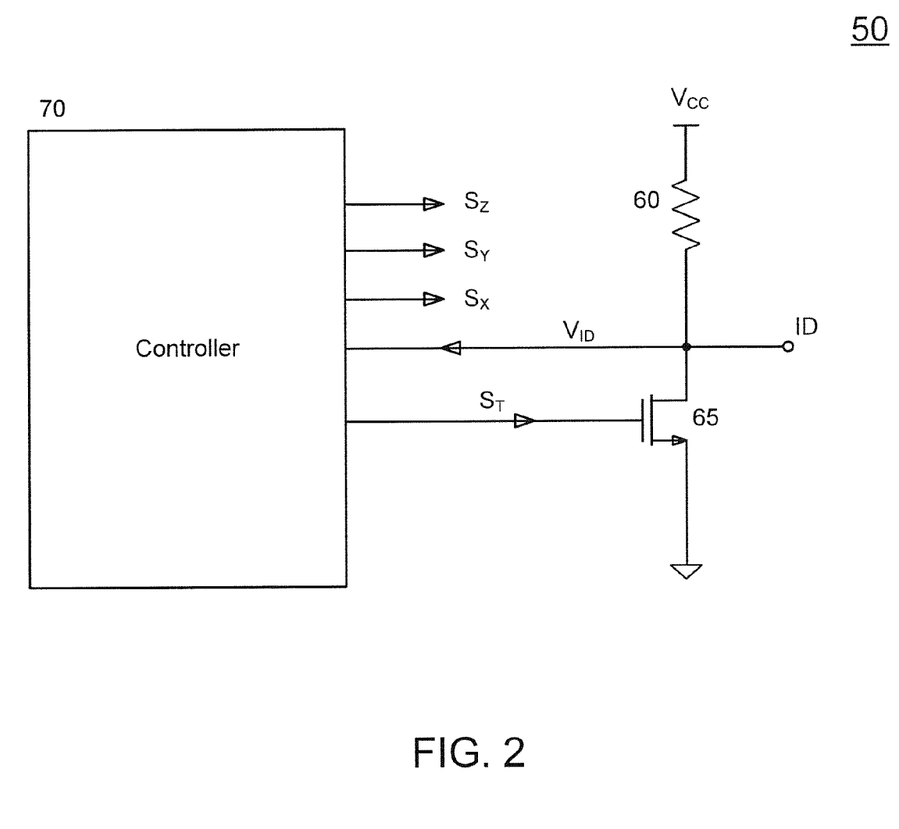
FIG. 2 is a circuit diagram of an embodiment of the control circuit according to the present invention.

FIG. 2 is a circuit diagram of an embodiment of the control circuit 50 according to the present invention. A controller 70 is connected to a gate of a transistor 65. The controller 70 generates a discharge signal $S_T$ coupled to control the gate of the transistor 65. A resistor 60 is connected between a drain of the transistor 65 and a voltage source $V_{CC}$. The transistor 65 is connected to the voltage source $V_{CC}$ via the resistor 60. The join of the transistor 65 and the resistor 60 is connected to the terminal ID of the programmable power adapter 10 (as shown in FIG. 1). A source of the transistor 65 is connected to the ground of the programmable power adapter 10.

The transistor 65 and the resistor 60 develop a signal coupled to the terminal ID of the programmable power adapter 10. The signal is sent to the device 20 (as shown in FIG. 1) via the terminals ID and the cable 1 (as shown in FIG. 1). The signal is coupled to the resistor 30 installed in the device 20, and the resistance of the resistor 30 determines the level of the signal. The controller 70 receives a voltage $V_{ID}$ from the terminal ID of the programmable power adapter 10. The level of the voltage $V_{ID}$ is correlated to the level of the signal developed by the transistor 65 and the resistor 60. In accordance with the level of the voltage $V_{ID}$ of the terminal ID, the controller 70 generate control signals $S_X$, $S_Y$ and $S_Z$ coupled to control the programmable power supply circuit 100 (as shown in FIG. 1). The transistor 65 is coupled to the capacitor 40 in the device 20 (as shown in FIG. 1) via the terminals ID and the cable 1. The transistor 65 is operated as a discharge switch to discharge the capacitor 40 when the transistor 65 is turned on by the discharge signal $S_T$.

Figure 3:
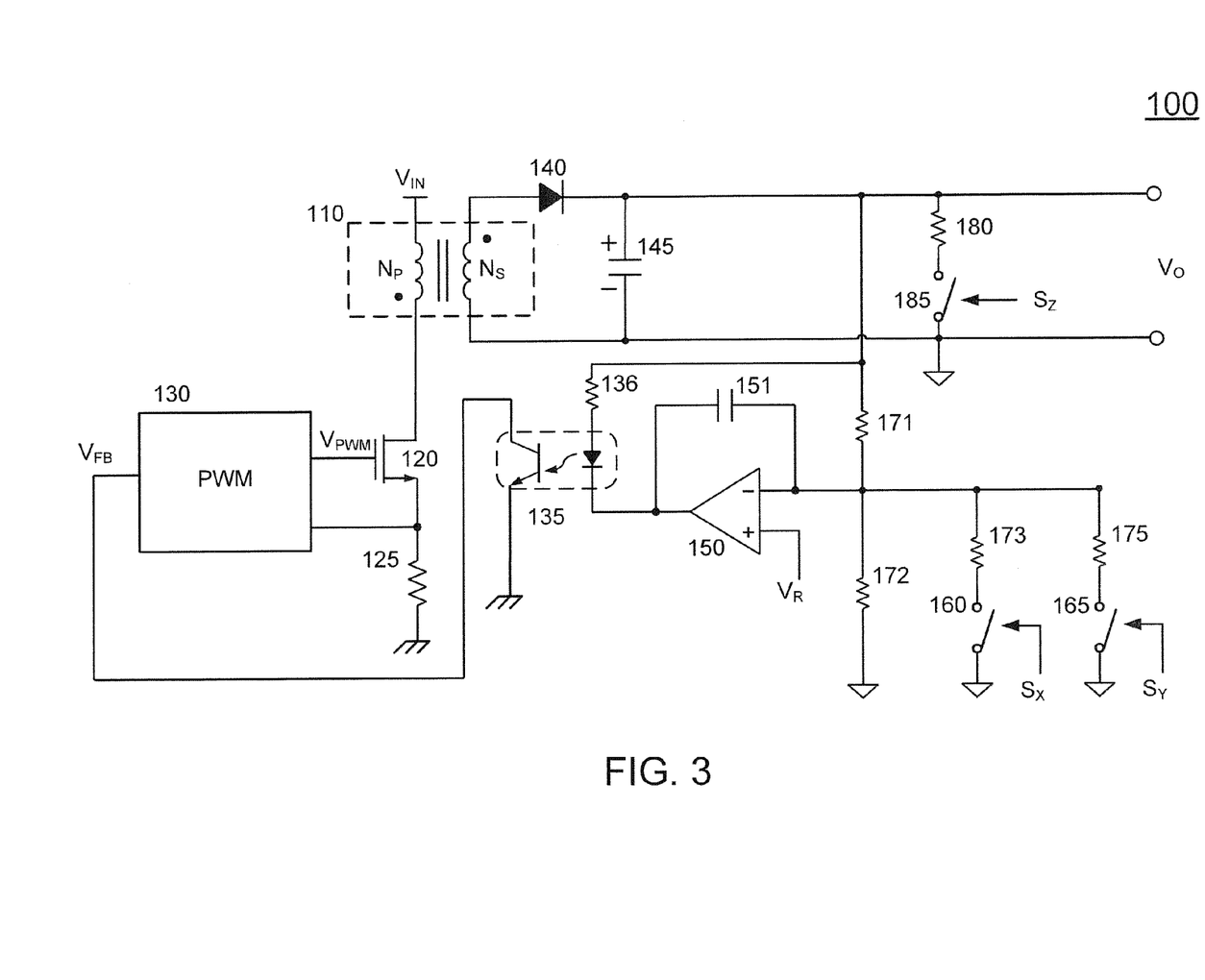
FIG. 3 is a circuit diagram of an embodiment of the programmable power supply circuit according to the present invention.

FIG. 3 is a circuit diagram of an embodiment of the programmable power supply circuit 100 according to the present invention. A PWM circuit (PWM) 130 is connected to a gate of a transistor 120. The transistor 120 is connected to a transformer 110. The PWM circuit 130 generates a PWM signal $V_{PWM}$ for switching the transformer 110 via the transistor 120. The transformer 110 has a primary winding $N_P$ and a secondary winding $N_S$. A resistor 125 is connected between a source of the transistor 120 and a ground. The primary winding $N_P$ of the transformer 110 is coupled to receive an input voltage $V_{IN}$. A first terminal of the secondary winding $N_S$ is connected to an anode of a rectifier 140. A cathode of the rectifier 140 is connected to a first terminal of an output capacitor 145. A second terminal of the output capacitor 145 is connected to a second terminal of the secondary winding $N_S$. The secondary winding $N_S$ of the transformer 110 will generate the output voltage $V_O$ through the rectifier 140 and the output capacitor 145.

An error amplifier 150 has a reference signal $V_R$ supplied to a positive input terminal of the error amplifier 150. A negative input terminal of the error amplifier 150 is coupled to the output voltage $V_O$ via resistors 171 and 172. A first terminal of the resistor 171 is connected to the first terminal of the output capacitor 145 and an output terminal of the programmable power supply circuit 100. The resistor 172 is connected between a second terminal of the resistor 171 and the ground. The resistors 171 and 172 form a voltage divider to receive the output voltage $V_O$. An output terminal of the error amplifier 150 is coupled to the PWM circuit 130 through an opto-coupler 135. The opto-coupler 135 is further coupled to the output voltage $V_O$ through a resistor 136. The resistor 136 is connected between the output terminal of the programmable power supply circuit 100 and an input terminal of the opto-coupler 135. The output terminal of the error amplifier 150 generates a feedback signal $V_{FB}$ coupled to the PWM circuit 130 via the opto-coupler 135 for programming the output voltage $V_O$.

The voltage divider (the resistors 171 and 172), the error amplifier 150, the opto-coupler 135, and the PWM circuit 130 develop a feedback loop for the programmable power supply circuit 100. A capacitor 151 is connected between the negative input terminal of the error amplifier 150 and the output terminal of the error amplifier 150. The capacitor 151 is used for the feedback loop compensation. The PWM signal $V_{PWM}$ is therefore generated in accordance with the feedback signal $V_{FB}$ to regulate the output voltage $V_O$. The output voltage $V_O$ can be expressed as, $$V_O = V_R \times \frac{R_{171} + R_{172}}{R_{172}} \quad (1)$$

Where the $R_{171}$ is the resistance of the resistor 171; the $R_{172}$ is the resistance of the resistor 172.

A first terminal of a resistor 173 is coupled to a join of the resistors 171 and 172. A switch 160 is connected between a second terminal of the resistor 173 and the ground. Therefore, the resistor 173 will be connected to the resistor 172 in parallel when the switch 160 is tuned on. The on/off of the switch 160 is controlled by the control signal $S_X$ generated by the controller 70 (as shown in FIG. 2). A first terminal of a resistor 175 is also coupled to the join of the resistors 171 and 172. A switch 165 is connected between a second terminal of the resistor 175 and the ground. Therefore, the resistor 175 will be connected to the resistor 172 in parallel when the switch 165 is turned on. The on/off of the switch 165 is controlled by the control signal $S_Y$ generated by the controller 70. Therefore, when the switch 160 is turned on, the output voltage $V_O$ will be expressed as, $$V_O = V_R \times \frac{R_{171} + R_{PX}}{R_{PX}} \quad (2)$$

$$R_{PX} = \frac{R_{172} + R_{173}}{R_{172} \times R_{173}} \quad (3)$$

Or, when the switch 165 is turned on, the output voltage $V_O$ is expressed as, $$V_O = V_R \times \frac{R_{171} + R_{PY}}{R_{PY}} \quad (4)$$

$$R_{PY} = \frac{R_{172} + R_{175}}{R_{172} \times R_{175}} \quad (5)$$

Where the $R_{173}$ is the resistance of the resistor 173; the $R_{175}$ is the resistance of the resistor 175.

According to above, the resistors 171, 172, 173, 175, switches 160, and 165 are operated as a programmable resistor circuit. The resistance of the programmable resistor circuit is programmed by the control signals $S_X$ and $S_Y$. The error amplifier 150 is utilized to program the output voltage $V_O$. The reference signal $V_R$ and the resistance of the programmable resistor circuit determine the output voltage $V_O$.

Furthermore, a resistor 180 and a switch 185 are connected in series that is paralleled with the output capacitor 145 and the output terminal of the programmable power supply circuit 100. The resistor 180 is coupled to discharge the output capacitor 145 (output of the programmable power supply circuit 100) when the switch 185 is turned on. The control signal $S_Z$ generated by the controller 70 controls the on/off of the switch 185. The switch 185 is connected between the resistor 180 and the ground. The resistor 180 will help to quickly discharge the output capacitor 145 when the output voltage $V_O$ is changed from a high voltage (e.g. 20V) to a low voltage (e.g. 5V). Therefore, the resistor 180 is operated as a bleeder resistor.

Figure 4:
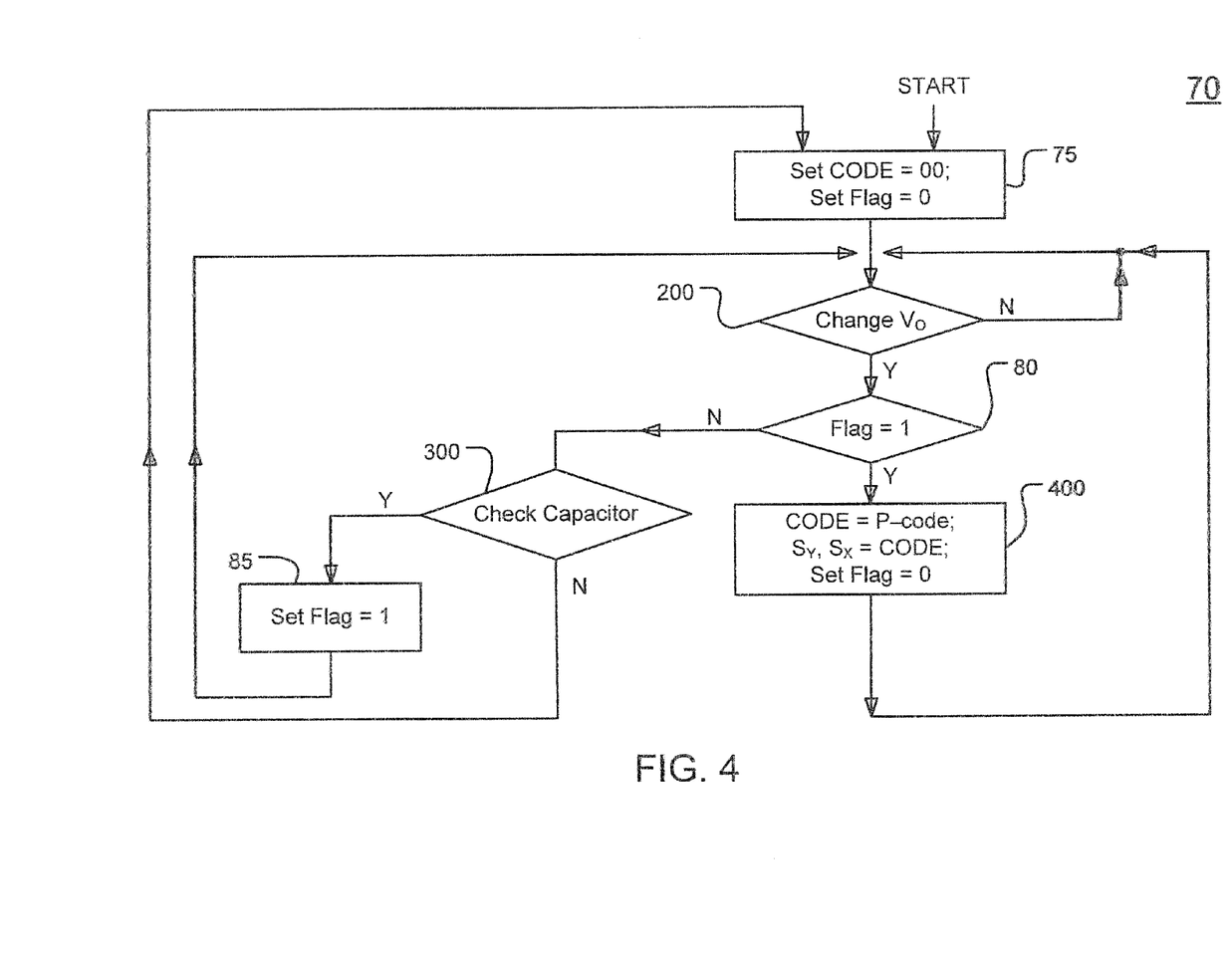
FIG. 4 is a control flow chart of an embodiment of the controller according to the present invention.

FIG. 4 is a control flow chart of an embodiment of the controller 70 according to the present invention. A CODE represents the control signals $S_Y$ and $S_X$ (as shown in FIG. 3). If the CODE is set as 00, it means $S_Y=0$ (off) and $S_X=0$ (off). If the CODE is set as 01, it means $S_Y=0$ (off) and $S_X=1$ (on). A flow 75 will set the CODE=00, and set a Flag=0. A flow 200 will check whether the change of the output voltage $V_O$ is required. A flag "Change $V_O$"=YES represents that the change of the output voltage $V_O$ is required. The flag "Change $V_O$"=NO represents that the change of the output voltage $V_O$ is not required. If the flag "Change $V_O$"=NO, then the flow 200 is repeated. If the flag "Change $V_O$"=YES, then a flow 80 will check whether the Flag=1. The flow 200 will set the Flag=1, as shown in a flow 290 in FIG. 5.

If the Flag=1, then a flow 400 will set "CODE=P-code", wherein the P-code is defined as a new CODE. The control signals $S_Y$, $S_X$ are thus determined by the new CODE, once "CODE=P-code" is confirmed, the output voltage $V_O$ will be selected according to the new CODE (P-code). Further, the flow 400 will set the Flag=0. Then, the controller 70 (as shown in FIG. 2) repeats the flow 200. If the Flag≠1 (flow 80), then a flow 300 will check whether the capacitor 40 (as shown in FIG. 1) is existed in the device 20 (as shown in FIG. 1) or not. A flag "Capacitor"=YES represents that a correct value of the capacitor 40 is existed. The correct value of the capacitor 40 (in the device 20) will be verified for the requirement of the change of the output voltage $V_O$. If the flag "Capacitor"=YES, then a flow 85 will set the Flag=1. After that the controller 70 repeats the flow 200. If the flag "Capacitor"=NO (flow 300) represents that the correct value of the capacitor 40 is not existed. Then, the controller 70 repeats the flow 75.

Figure 5:
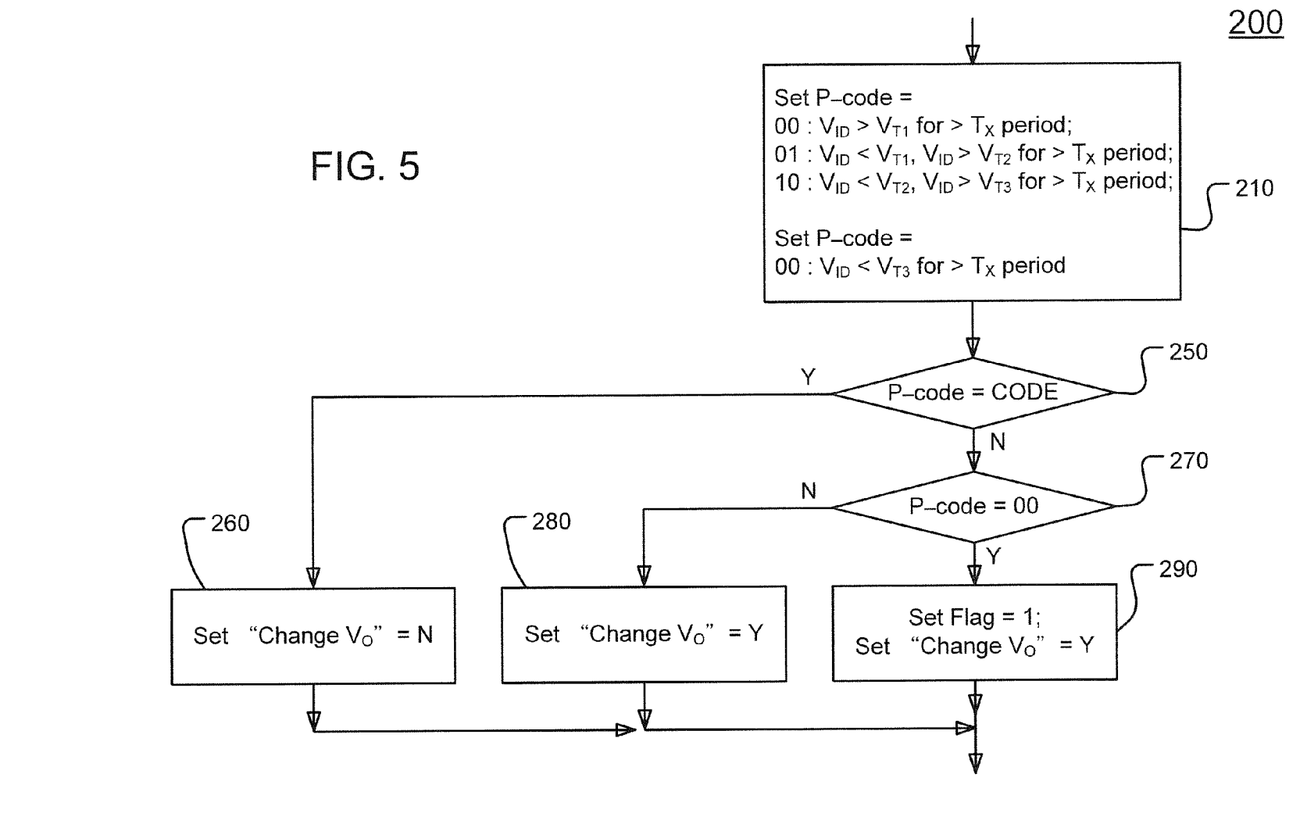
FIG. 5 is a flow chart of an embodiment for checking whether the change of the output voltage is required according to the present invention.

FIG. 5 is a flow chart of an embodiment of the control flow 200 according to the present invention. A flow 210 will set the P-code according to the level of the voltage $V_{ID}$ of the terminal ID (as shown in FIG. 1). The P-code will be set as, 00: if the level of the voltage $V_{ID}$ is higher than a threshold $V_{T1}$ (e.g. 3.5V) for more than a $T_X$ period (e.g. >20 msec);

01: if the level of the voltage $V_{ID}$ is lower than the threshold $V_{T1}$ and higher than a threshold $V_{T2}$ (e.g. 2.5V) for more than the $T_X$ period;

10: if the level of the voltage $V_{ID}$ is lower than the threshold $V_{T2}$ and higher than a threshold $V_{T3}$ (e.g. 15V) for more than the $T_X$ period;

Furthermore, the P-code will be set as (the default value),

00: if the level of the voltage $V_{ID}$ is lower than the threshold $V_{T3}$ for more than the $T_X$ period.

A flow 250 will check whether the P-code is equal to the CODE or not. If the P-code is equal to the CODE, then a flow 260 will set the flag "Change $V_O$"=NO. If the P-code is not equal to the CODE, then a flow 270 will further check whether P-code=00 or not. If the P-code=00, then a flow 290 will set the Flag=1 and set the flag "Change $V_O$"=YES. If the P-code 00, then a flow 280 will only set the flag "Change $V_O$"=YES.

Further, the control circuit 50 (as shown in FIG. 1) will filter the voltage $V_{ID}$ of the terminal ID for checking the level of the voltage $V_{ID}$. According to an embodiment of the present invention, a de-bounce apparatus is in the control circuit 50 for filtering the voltage $V_{ID}$.

Figure 6:
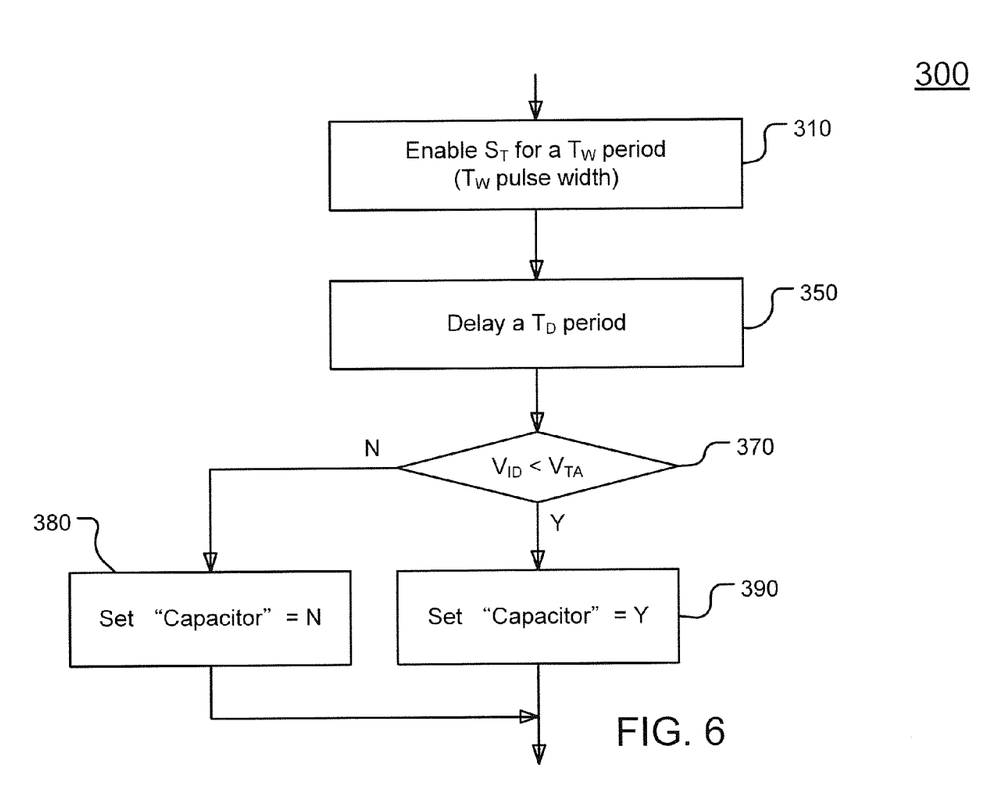
FIG. 6 is a flow chart of an embodiment for checking whether the capacitor is existed in the device according to the present invention.

FIG. 6 is a flow chart of an embodiment of the control flow 300 according to the present invention. A flow 310 will enable the discharge signal $S_T$ (as shown in FIG. 2) for a period $T_W$ (e.g. 10 msec), and then disable the discharge signal $S_T$. A flow 350 will do a time delay for a period $T_D$ (e.g. 300 μsec). After that, a flow 370 will check whether the level of the voltage $V_{ID}$ is lower than a threshold $V_{T4}$ (e.g. 0.7V) or not. If the level of the voltage $V_{ID}$ is lower than the threshold $V_{T4}$, then a flow 390 will set the flag "Capacitor"=YES. If the level of the voltage $V_{ID}$ is not lower than the threshold $V_{T4}$, then a flow 380 will set the flag "Capacitor"=NO.

Figure 7:
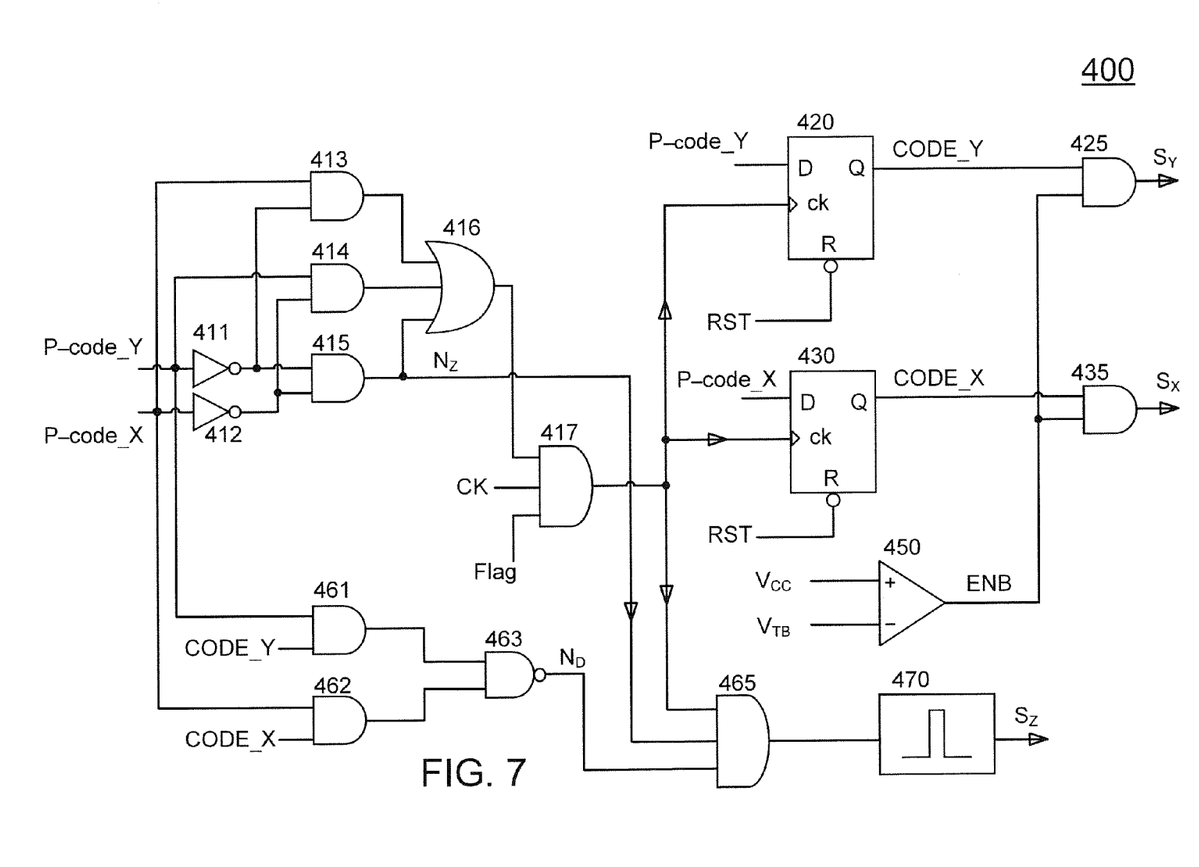
FIG. 7 is a circuit diagram of an embodiment of the controller for generating the control signals according to the present invention.

FIG. 7 is a circuit diagram of an embodiment of the controller 70 for the control flow 400 according to the present invention. As shown in FIG. 7, this circuit is utilized to generate the control signals $S_Y$, $S_X$, and $S_Z$. An Output terminal Q of a flip-flop 420 is connected to an input terminal of an AND gate 425. An output terminal of the AND gate 425 outputs the control signal $S_Y$. An Output terminal Q of a flip-flop 430 is connected to an input terminal of an AND gate 435. An output terminal of the AND gate 435 outputs the control signal $S_X$. An output terminal of a comparator 450 is connected to the other input terminals of the AND gates 425 and 435. Two input terminals of the comparator 450 respectively receive the voltage source $V_{CC}$ and a threshold $V_{TB}$ for generating an enable signal ENB.

The flip-flop 420 and the flip-flop 430 are utilized to store the CODE (CODE_Y and CODE_X respectively). The CODE is coupled to produce the control signals $S_Y$ and $S_X$ (via the AND gate 425 and the AND gate 435 respectively) when the level of the voltage source $V_{CC}$ is higher than the threshold $V_{TB}$. As shown in FIG. 3, the control signals $S_Y$ and $S_X$ are supplied to the programmable power supply circuit 100 to select the output voltage $V_O$.

The P-code (P-code_Y and P-code_X) is coupled to input terminals D of the flip-flops 420 and 430. The input terminal D of the flip-flop 420 is coupled to receive the P-code_Y. The output terminal Q of the flip-flop 420 outputs the CODE_Y in response to the P-code_Y. The input terminal D of the flip-flop 430 is coupled to receive the P-code_X. The output terminal Q of the flip-flop 430 outputs the CODEX in response to the P-code_X. A power-on-reset signal RST is applied to reset input terminals R of the flip-flops 420 and 430 to reset the flip-flops 420 and 430.

Input terminals of inverters 411 and 412 respectively receive the P-code_Y and P-code_X. An input terminal of an AND gate 413 is coupled to receive the P-code_Y through the inverter 411. The other input terminal of the AND gate 413 is coupled to receive the P-code_X. An input terminal of an AND gate 414 is coupled to receive the P-code_X through the inverter 412. The other input terminal of the AND gate 414 is coupled to receive the P-code_Y. Input terminals of an AND gate 415 are coupled to receive the P-code_Y and the P-code_X through the inverters 411 and 412, respectively. An output terminal of the AND gate 415 generates a signal $N_Z$. Output terminals of the AND gates 413, 414, and 415 are coupled to input terminals of an OR gate 416. respectively. Input terminals of an AND gate 417 are coupled to receive an output of the OR gate 416, a clock signal CK, and the value of the Flag, respectively. An output terminal of the AND gate 417 is coupled to generate a latch signal couple to clock input terminals ck of the flip-flops 420 and 430.

The inverters 411, 412, the AND gates 413, 414, 415, 417, and the OR gate 416 develop a circuit for generating the latch signal to latch the P-code (P-code_Y and P-code_X) into the flip-flops 420 and 430. The latch signal will be generated to enable the "CODE=P-code (CODE_X=P-code_X and CODE_Y=P-code_Y)" if, (a) P-code=00 or 01 or 10; and
(b) Flag=1; and
(c) The clock signal CK is generated (synchronized with the clock signal CK).

Input terminals of an AND gate 46) are coupled to receive the P-code_Y and the CODE_Y, respectively. Input terminals of an AND gate 462 are coupled to receive the P-code_X and the CODE_X, respectively. Input terminals of a NAND gate 463 are coupled to output terminals of the AND gates 461 and 462, respectively. An output terminal of the NAND gate 463 generates a signal $N_{ID}$. Input terminals of an AND gate 465 are coupled to the output terminals of the AND gates 415, 417, and the NAND gate 463 to receive the signal $N_Z$, the latch signal, and the signal $N_D$ for generating a trigger signal. An output terminal of the AND gate 465 is coupled to a pulse signal generator 470. The pulse signal generator 470 will generate the control signal $S_Z$ in response to the trigger signal generated by the AND gate 465. The AND gate 465 will generate the trigger signal when, (i) CODE_Y≠P-code_Y or CODE_X≠P-code_X (the AND gates 461, 462, and the NAND gate 463); and
(ii) P-code=00 (the inverters 411, 412, and the AND gate 415); and
(iii) the latch signal is generated.

Therefore, the control signal $S_Z$ will be generated as a pulse signal to discharge the output capacitor 145 (as shown in FIG. 3) when the output voltage $V_O$ is changed from a high voltage to a low voltage. The pulse width of the control signal $S_Z$ is determined by the pulse signal generator 470.

Figure 8:
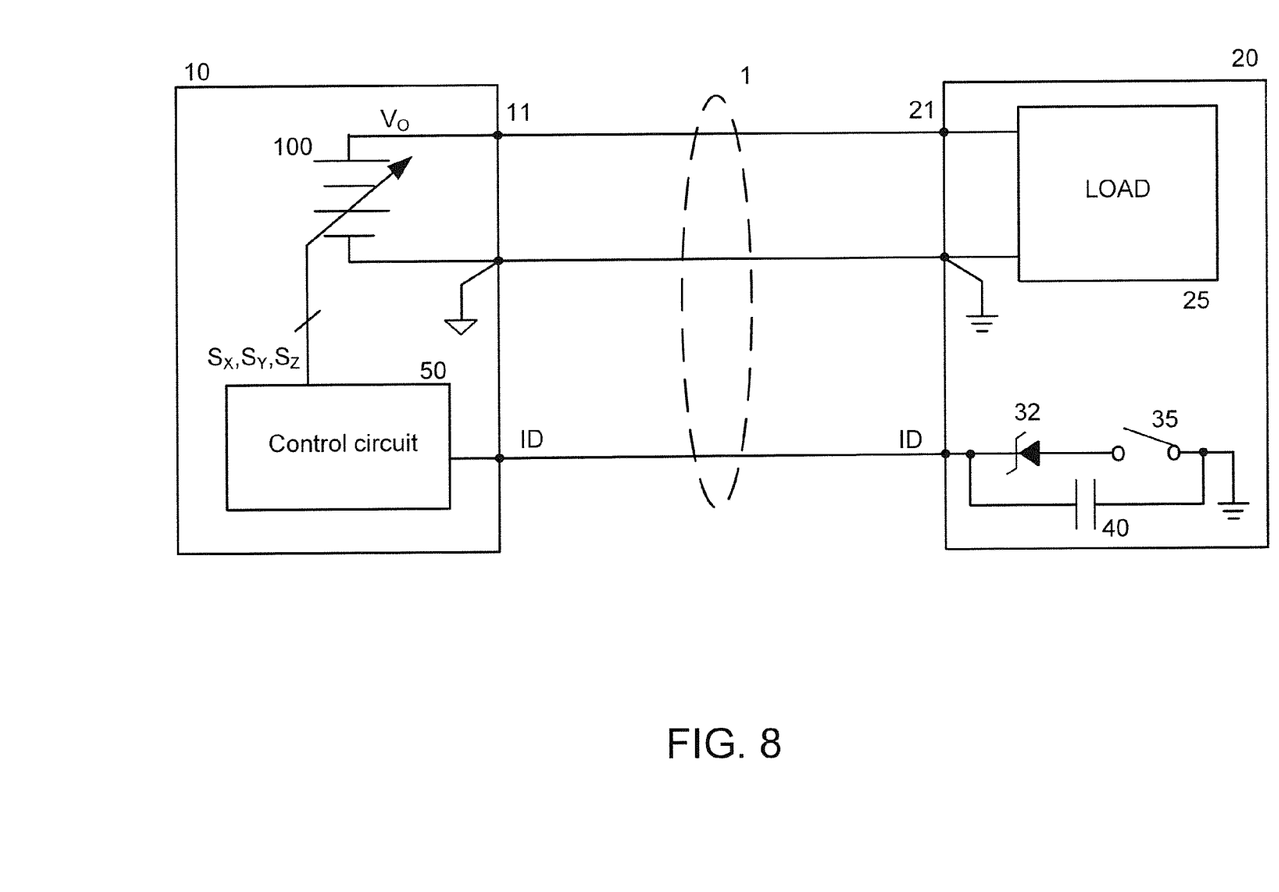
FIG. 8 is a circuit diagram of another embodiment of the system for selecting the output of the programmable power adapter according to the present invention.

FIG. 8 is a circuit diagram of another embodiment of the system for selecting the output of the programmable power adapter 10 according to the present invention. In this embodiment, the device 20 includes a voltage-clamp device 32 to replace the resistor 30 shown in FIG. 1. The first terminal of the voltage-clamp device 32 is connected to the control circuit 50 of the programmable power adapter 10 via the terminals ID and the cable 1 to receive the signal (voltage $V_{ID}$ shown in FIG. 2) of the programmable power adapter 10. The voltage-clamp device 32 determines the level of the signal (voltage $V_{ID}$) of the programmable power adapter 10. A second terminal of the voltage-clamp device 32 is connected to the ground via the switch 35. The voltage-clamp device 32 is connected with the switch 35 is series, that is paralleled with the capacitor 40. Once the switch 35 is turned on, the capacitor 40 is coupled to the voltage-clamp device 32 in parallel. The value of the voltage-clamp device 32 is utilized to program the level of the output voltage $V_O$. The voltage-clamp device 32 can be a zener-diode according to one embodiment of the present invention.

Although the present invention and the advantages thereof have been described in detail, it should be understood that various changes. substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A method of programming an output of a programmable power adapter, comprising:
   sending a signal to a device;
   checking the level of the signal in the programmable power adapter with at least one threshold to set a code; and
   determining whether change of an output voltage of the programmable power adapter is required in accordance with the code and programming the output voltage in accordance with the code if required;
   wherein a resistor installed in the device is coupled to the signal to determine the level of the signal; the output voltage of the programmable power adapter is coupled to the device to provide a power for a load of the device.

2. The method as claimed in claim 1, further comprising:
   filtering the signal for checking the level of the signal;
   wherein a de-bounce apparatus is applied to filter the signal; the de-bounce apparatus is in the programmable power adapter.

3. The method as claimed in claim 1, wherein the device further comprises a capacitor coupled to the resistor in parallel.

4. The method as claimed in claim 3, wherein the programmable power adapter further comprises a discharge switch coupled to discharge the capacitor, the discharge switch is in the programmable power adapter.

5. The method as claimed in claim 1, wherein the device further comprises a switch connected to the resistor in serial.

6. The method as claimed in claim 1, further comprising:
providing a bleeder resistor to an output terminal of the programmable power adapter for the discharge of the output voltage of the programmable power adapter when the output voltage of the programmable power adapter is changed from a high voltage to a low voltage.

7. A method of programming an output of a power adapter, comprising:
sending a signal to a device;
checking the level of the signal in the power adapter with at least one threshold to set a code; and
determining whether change of an output voltage of the power adapter is required in accordance with the code and programming the output voltage in accordance with the code if required;
wherein a voltage-clamp device installed in the device is coupled to the signal to determine the level of the signal; the output voltage of the power adapter is coupled to the device to provide a power for a load of the device.

8. The method as claimed in claim 7, further comprising:
filtering the signal for checking the level of the signal;
wherein a de-bounce apparatus is applied to filter the signal; the de-bounce apparatus is in the power adapter.

9. The method as claimed in claim 7, wherein the device further comprises a capacitor coupled to the voltage-clamp device in parallel.

10. The method as claimed in claim 9, wherein the power adapter further comprises a discharge switch coupled to discharge the capacitor, the discharge switch is in the power adapter.

11. The method as claimed in claim 7, wherein the device further comprises a switch connected to the voltage-clamp device in serial.

12. The method as claimed in claim 7, further comprising:
providing a bleeder resistor to an output terminal of the power adapter for the discharge of the output voltage of the power adapter when the output voltage of the power adapter is changed from a high voltage to a low voltage.

13. The method as claimed in claim 7, wherein the device is a mobile device.

14. An apparatus of programming an output of a programmable power adapter, comprising:
a control circuit sending a signal to a device, in which the device is coupled to the signal to determine the level of the signal, the control circuit checks the level of the signal with at least one threshold to set a code, the control circuit determines whether change of an output voltage of the programmable power adapter is required in accordance with the code and programs the output voltage in accordance with the code if required;
wherein an identification circuit installed in the device is coupled to the signal to determine the level of the signal; the output voltage of the programmable power adapter is coupled to the device to provide a power for a load of the device.

15. The apparatus as claimed in claim 14, wherein the device further comprises a switch connected to the identification circuit in serial.

16. A programmable power adapter, comprising:
a control circuit sending a signal to a device, in which the device is coupled to the signal to determine the level of the signal, the control circuit checks the level of the signal with at least one threshold to set a code, the control circuit determines whether change of an output voltage of the programmable power adapter is required in accordance with the code and programs the output voltage in accordance with the code if required; and
a programmable power supply circuit generating the output voltage of the programmable power adapter and controlled by the control circuit for determining the output voltage in accordance with the code.

17. The programmable power adapter as claimed in claim 16, wherein the device comprises an identification circuit installed in the device, and the identification circuit is coupled to the signal to determine the level of the signal.

18. The programmable power adapter as claimed in claim 16, wherein the programmable power supply circuit comprises:
a programmable resistor circuit coupled to the output voltage, in which the resistance of the programmable resistor circuit is programmed in accordance with the code; and
an error amplifier coupled to the programmable resistor circuit and a reference signal for programming the output voltage of the programmable power adapter;
wherein the reference signal and the resistance of the programmable resistor circuit determine the output voltage.

* * * * *